(12) United States Patent
Kamikawa et al.

(10) Patent No.: US 8,047,724 B2
(45) Date of Patent: Nov. 1, 2011

(54) BEARING DEVICE FOR WHEEL

(75) Inventors: Tsuyoshi Kamikawa, Nara (JP); Yoshito Takada, Nara (JP); Masaru Deguchi, Kashihara (JP); Ken Adachi, Kashiba (JP); Youichi Tsuzaki, Kashiba (JP); Seiji Yamamoto, Yao (JP); Changxin Yu, Kashiwara (JP); Masao Takimoto, Kashiwara (JP); Tetsuya Ishikawa, Kashiwara (JP); Syuuji Nagata, Osaka (JP)

(73) Assignee: JTEKT Corporation, Osaka-shi (JP)

( * ) Notice: Subject to any disclaimer, the term of this patent is extended or adjusted under 35 U.S.C. 154(b) by 207 days.

(21) Appl. No.: 12/094,160

(22) PCT Filed: Mar. 26, 2007

(86) PCT No.: PCT/JP2007/056260
§ 371 (c)(1),
(2), (4) Date: May 19, 2008

(87) PCT Pub. No.: WO2007/111316
PCT Pub. Date: Oct. 4, 2007

(65) Prior Publication Data
US 2008/0258541 A1 Oct. 23, 2008

(30) Foreign Application Priority Data

Mar. 28, 2006 (JP) ................. 2006-087909
Mar. 29, 2006 (JP) ................. 2006-091281
Mar. 31, 2006 (JP) ................. 2006-100033

(51) Int. Cl.
*F16C 13/00* (2006.01)
*B60B 27/00* (2006.01)
(52) U.S. Cl. ............ 384/589; 384/544; 301/105.1
(58) Field of Classification Search .......... 384/537, 384/543, 544, 548, 558, 559, 569, 581, 582, 384/583, 584, 585, 589; 464/182; 301/105.1; 192/69.4–69.43
See application file for complete search history.

(56) References Cited

U.S. PATENT DOCUMENTS

| | | | | | |
|---|---|---|---|---|---|
| 2,481,812 | A | * | 9/1949 | Beatrice | 74/569 |
| 6,170,628 | B1 | * | 1/2001 | Bigley | 192/69.41 |
| 6,299,360 | B1 | * | 10/2001 | Dougherty et al. | 384/584 |
| 6,371,268 | B1 | * | 4/2002 | McMorris et al. | 192/69.41 |
| 6,557,660 | B2 | * | 5/2003 | Averill et al. | 180/247 |
| 7,143,883 | B2 | * | 12/2006 | McCalla et al. | 192/69.41 |
| 7,513,691 | B2 | * | 4/2009 | Beck | 384/513 |

FOREIGN PATENT DOCUMENTS

| | | | |
|---|---|---|---|
| JP | 60 139525 | | 9/1985 |
| JP | 2000 351336 | | 12/2000 |
| JP | 2001 163003 | | 6/2001 |
| JP | 2003 507683 | | 2/2003 |
| JP | 2003 205833 | | 7/2003 |
| WO | WO2005/064158 | * | 7/2005 |

* cited by examiner

*Primary Examiner* — James Pilkington
(74) *Attorney, Agent, or Firm* — Oblon, Spivak, McClelland, Maier & Neustadt, L.L.P.

(57) ABSTRACT

A wheel bearing apparatus includes a roller bearing, an inner shaft having an outer circumferential surface to which an inner ring of the roller bearing is installed, a coupler ring attached to an end portion of the inner shaft, and a caulked portion provided in an end portion of the inner shaft so as to fix the coupler ring and the roller bearing to the inner shaft so as to be immovable in an axial direction of the inner shaft. An outer diameter of the coupler ring is set smaller than a diameter of a shoulder portion of the inner ring. Alternatively, a protruding portion is provided in any one of opposing end surfaces of the coupler ring and the inner ring, whereby the coupler ring is arranged away from a seal member. Accordingly, it is possible to avoid an interference of the coupler ring with the seal member.

4 Claims, 9 Drawing Sheets

BEARING DEVICE FOR WHEEL

FIELD OF THE INVENTION

The present invention relates to a wheel bearing apparatus which is mainly used in a vehicle such as a motor vehicle or the like.

DISCUSSION OF THE BACKGROUND

As a wheel bearing apparatus for a part-time 4WD vehicle which can be switched between a two-wheel drive (2WD) mode and a four-wheel drive (4WD) mode, there has been known a structure which can selectively couple a drive shaft (an axle) connected to an engine to a wheel and cancel the coupling, that is, can selectively allow and shut off a transmission of a driving force from the drive shaft to the wheel (refer, for example, to Patent Documents 1 and 2).

In the wheel bearing apparatus mentioned above, a roller bearing for rotatably supporting an inner shaft (a hub shaft) with respect to a suspension apparatus is installed to an outer circumference of the inner shaft to which the wheel is attached. A center of the inner shaft is provided with a center hole to which a drive shaft is inserted. The drive shaft is rotatably supported to the inner shaft by a needle bearing press fitted into the center hole. Further, the wheel bearing apparatus is provided with a coupler ring receiving the transmission of the rotation from the drive shaft via a clutch member. The coupler ring is fixed to an end portion in a vehicle inner side (an opposite side to a side in which the wheel is attached) of the inner shaft, and has a spline in an outer circumferential surface. If the clutch member rotating in synchronous with the drive shaft is engaged with the outer circumferential spline of the coupler ring, the drive shaft and the inner shaft are operationally coupled, and the transmission of the driving force from the drive shaft to the wheel is allowed. On the other hand, if the clutch member is not engaged with the outer circumferential spline of the coupler ring, the operational coupling between the drive shaft and the inner shaft is cancelled, and the transmission of the driving force from the drive shaft to the wheel is shut off.

In the wheel bearing apparatus mentioned above, a spline is formed in an inner circumferential surface of the coupler ring and the inner side end portion of the inner shaft. The coupler ring and the inner shaft are coupled so as to be integrally rotatable, on the basis of the spline engagement between the coupler ring and the inner shaft. The coupler ring is fixed to the inner shaft in an axial direction by caulking the inner side end portion of the inner shaft and plastically deforming the end portion radially outward. The shaft end caulking mentioned above is executed by pressing a caulking jig against the inner side end portion of the inner shaft from the vehicle inner side in a state of bringing a vehicle outer side end surface of the inner ring of the roller bearing into contact with a flange portion side surface of the inner shaft, and bringing an end surface of the coupler ring into contact with the vehicle inner side end surface of the inner ring. Accordingly, the coupler ring and the inner ring are reliably fixed to the inner shaft, and a suitable preload is applied to the coupler ring and the inner ring. Since two wheels corresponding to coasting wheels at a time of traveling in the 2WD mode do not rotate a drive system (an axle shaft, a differential, a propeller shaft or the like) in the case of using the wheel bearing apparatus, it is possible to achieve an improvement of a fuel consumption, a reduction of a vibration and a noise, an improvement of a durability of driving parts.

In the wheel bearing apparatus mentioned above, the end surface of the coupler ring is pressed to the end surface of the inner ring of the roller bearing. Accordingly, there is a risk that the end surface of the coupler ring comes into contact with the seal member provided in the roller bearing. If a deformation is generated in the seal member on the basis of the contact of the end surface of the coupler ring, a function of the seal member for preventing a foreign material from making an intrusion into the inner portion of the bearing is lowered. Further, there is a case that a burr at a time of forming the spline is left in the end surface of the outer circumferential spline in the end surface of the coupler ring, in a state of being attached thereto. Accordingly, in the case that the end surface of the outer circumferential spline of the coupler ring comes into contact with the seal member, such an interference that the burr presses the seal member may be generated.

Further, in the wheel bearing apparatus mentioned above, the shaft end caulking is executed by pressing the caulking jig to the inner side end portion of the inner shaft from the vehicle inner side. Accordingly, a bulge in a radial direction is generated in the inner shaft on the basis of the shaft end caulking. The bulge mentioned above can be generated in an inner circumferential side in addition to an outer circumferential side of the inner shaft. If the bulge is generated in the inner circumferential side of the inner shaft, that is, an inner wall of the center hole is bulged, a needle bearing is deformed at a time of press fitting the needle bearing to the center hole so as to assemble. Alternatively, the needle bearing which is previously arranged within the center hole is deformed. In the case that an inscribed circle diameter of the needle bearing becomes smaller due to the deformation of the needle bearing, an overload in a radial direction is applied to the drive shaft. As a result, a rotation of the drive shaft is obstructed, thereby causing a deterioration of the fuel consumption and a deterioration of the durability of the needle bearing and the drive shaft.

Further, in the case of the shaft end caulking, it is not easy to accurately apply a preload having a desired magnitude to the bearing. This is because the pressure applied to the end portion of the inner shaft for caulking the end portion of the inner shaft is also dispersed to the radial direction of the inner shaft. Further, the reasons include the fact that the coupler ring is interposed between the caulked portion and the bearing. In other words, it becomes complicated to control the preload for accurately applying the preload having the desired magnitude to the bearing and a lot of manufacturing processes are required. Further, in order to further improve a steering feeling at a time of traveling the vehicle, there is required a further improvement of the rigidity in the wheel bearing apparatus.

Patent Document 1: Japanese National Phase Laid-Open Patent Publication No. 2003-507683

Patent Document 2: Japanese Laid-Open Patent Publication No. 2000-351336

SUMMARY OF THE INVENTION

A first objective of the present invention is to provide a wheel bearing apparatus which can avoid an interference of a coupler ring with a seal member of a roller bearing.

A second objective of the present invention is to provide a wheel bearing apparatus which can suppress a deformation of a bearing member arranged within a center hole of an inner shaft caused by a bulge generated in an inner wall of a center hole of an inner shaft on the basis of a caulking of an inner side end portion of the inner shaft.

A third objective of the present invention is to provide a wheel bearing apparatus which can easily execute a preload control, and can improve a bearing rigidity.

In order to achieve the first objective mentioned above, in accordance with one aspect of the present invention, there is provided a wheel bearing apparatus provided with a roller bearing, an inner shaft, a coupler ring, a caulked portion, and an avoiding structure. The roller bearing has an outer ring, an inner ring, a rolling element, and a seal member. The inner shaft has a center hole allowing insertion of a drive shaft. The inner ring of the roller bearing is installed to an outer circumferential surface of the inner shaft. The coupler ring is attached to an end portion of the inner shaft. The caulked portion is provided in the end portion of the inner shaft for fixing the coupler ring and the roller bearing to the inner shaft so as to be immobile in an axial direction of the inner shaft. The avoiding structure is provided for avoiding an interference of the coupler ring with a seal member of the roller bearing.

In order to achieve the second objective mentioned above, in accordance with another aspect of the present invention, there is provided a wheel bearing apparatus provided with a roller bearing, an inner shaft, a coupler ring, and a cylindrical bearing member. The inner shaft has a center hole allowing insertion of a drive shaft. The roller bearing is installed to an outer circumferential surface of the inner shaft. The coupler ring is fixed to the inner shaft by caulking an inner side end portion of the inner shaft, and receives a transmission of a rotation from the drive shaft via a clutch member. The bearing member is arranged within the center hole and rotatably supports the drive shaft. An inner side portion in an outer circumferential surface of the bearing member is away from an inner wall of the center hole.

In order to achieve the third objective mentioned above, in accordance with a further aspect of the present invention, there is provided a wheel bearing apparatus provided with a hub shaft, a roller bearing, and a coupler ring. The hub shaft has a flange portion for attaching a wheel in an end portion in an outer side of a vehicle. The roller bearing is provided win an inner ring installed to an outer circumferential surface of an axial center portion of the hub shaft in such a manner as to be brought into contact with the flange portion, an outer ring attached to a suspension apparatus of the vehicle, and a rolling element interposed between the outer ring and the inner ring. The coupler ring is installed to an outer circumferential surface of the hub shaft in such a manner as to be brought into contact with an end surface in a vehicle inner side of the inner ring. The coupler ring is operationally coupled to a joint outer ring in the case of transmitting a driving force of the vehicle to the hub shaft, and is detached from the joint outer ring in the case that the driving force of the vehicle is not transmitted to the hub shaft. The coupler ring is installed to the hub shaft by screwing in such a manner as to press the inner ring along an axial direction of the hub shaft toward the flange portion, whereby a preload is applied to the roller bearing.

DETAILED DESCRIPTION OF THE PREFERRED EMBODIMENTS

Figure 1:
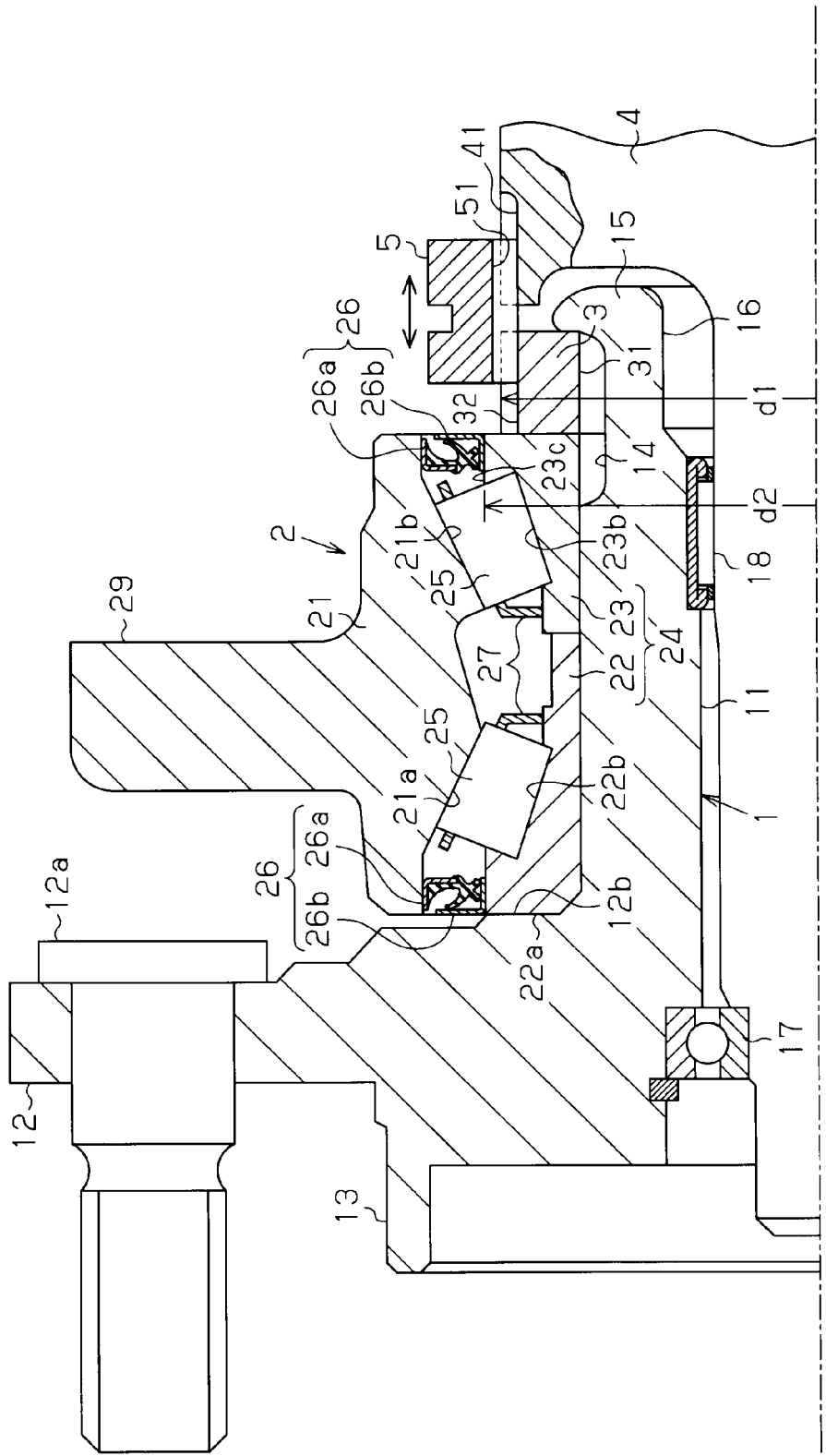
FIG. 1 is a longitudinal cross-sectional view of a wheel bearing apparatus in accordance with a first embodiment of the present invention.

A description will be given below of a first embodiment in accordance with the present invention with reference to FIG. 1. FIG. 1 is a longitudinal cross-sectional view of a wheel bearing apparatus in accordance with the first embodiment.

A wheel bearing apparatus shown in FIG. 1 is provided with an inner shaft 1, a roller bearing 2, and a coupler ring 3.

The inner shaft 1 has a shaft portion 11, a flange portion 12 formed in an outer side end portion of the shaft portion 11 in such a manner as to extend radially outward, and a cylindrical socket portion 13 protruding further to a vehicle outer side than the flange portion 12. A wheel (not shown) is fastened to the flange portion 12 by a bolt 12a. The roller bearing 2 for rotatably supporting the inner shaft 1 with respect to a suspension apparatus of a vehicle body (not shown) is installed to an outer circumferential surface of a center portion in an axial direction of the shaft portion 11. A double row tapered roller bearing is used as the roller bearing 2. The double row tapered roller bearing is generally used for receiving a great radial load, axial load, and moment load applied from the vehicle body having a large weight.

A spline 14 for fixing the coupler ring 3 is formed in an outer circumferential surface of an inner side end portion of the shaft portion 11 of the inner shaft 1. The coupler ring 3 constructs a switch mechanism selectively allowing and shutting off a transmission of the driving force from the drive shaft, as mentioned below. Further, a caulked portion 15 is provided in an inner side end portion of the shaft portion 11 in which the spline 14 is formed, by plastically deforming the end portion radially outward at a time of assembling. The caulked portion 15 plays a role of applying a preload to the roller bearing 2 and the coupler ring 3 as well as fixing the roller bearing 2 and the coupler ring 3 to the shaft portion 11 so as to be immobile in the axial direction of the shaft portion 11.

The shaft portion 11 has a center hole 16 allowing insertion of the drive shaft 4. In the center hole 16, a ball bearing 17 is arranged in a vehicle outer side for supporting the drive shaft 4, and a shell needle bearing 18 is arranged in a vehicle inner side. A deep groove ball bearing is used as the ball bearing 17, and the ball bearing 17 is arranged at substantially the same axial position as the flange portion 12 of the inner shaft 1. The shell needle bearing 18 is arranged at substantially the same axial position as inner side tapered rollers 25 of the double row tapered roller bearing serving as the roller bearing 2. Since two bearings 17 and 18 are provided as mentioned above, the inner shaft 1 and the drive shaft 4 are firmly supported in a coaxial state with each other, and a rigidity of the wheel bearing apparatus is increased. Further, since the bearing in the vehicle inner side is constituted by the shell needle bearing 18, a thickness of the inner shaft 1 in the portion to which the bearing 18 is attached can be easily secured.

The double row tapered roller bearing serving as the roller bearing 2 has an outer ring 21, an inner ring 24 constituted by a first inner ring 22 arranged in a vehicle outer side and a second inner ring 23 arranged in a vehicle inner side, the tapered rollers 25 serving as a double row rolling element and arranged in the vehicle outer side and the vehicle inner side, a seal member 26 arranged in the vehicle outer side and the vehicle inner side, retainers 27 arranged in the vehicle outer side and the vehicle inner side, and the like.

An outer side end surface 22a of the first inner ring 22 is brought into contact with a radial surface 12b positioned near a base portion of the flange portion 12 of the inner shaft 1. The second inner ring 23 is arranged so as to be adjacent to the vehicle inner side of the first inner ring 22. The first inner ring 22 has a first inner ring track 22b corresponding to a track surface of the tapered rollers 25 in the vehicle outer side, and the second inner ring 23 has a second inner ring track 23b corresponding to a track surface of the tapered rollers 25 in the vehicle inner side.

On the other hand, the outer ring 21 has a first outer ring track 21a opposing to the first inner ring track 22b, and a second outer ring track 21b opposing to the second inner ring track 23b. A flange portion 29 extending radially outward is provided in an outer circumferential surface of the outer ring 21. The flange portion 29 is attached to the suspension apparatus of the vehicle body. The tapered rollers 25 in the vehicle outer side is arranged between the first inner ring track 22b and the first outer ring track 21a, and the tapered rollers 25 in the vehicle inner side is arranged between the second inner ring track 23b and the second outer ring track 21b. The retainers 27 are structured such as to arrange the tapered rollers 25 at a uniform interval, and prevent the tapered rollers 25 from getting out to an outer side, and are formed in accordance with a resin injection molding or a sheet metal pressing.

The seal member 26 prevents a foreign material such as muddy water, gravel, pebbles or the like from making an intrusion into an inner portion of the roller bearing 2 from a gap between the outer ring 21 and the inner ring 24 in accordance with the travel of the vehicle. The seal member 26 is constituted by a pack seal obtained by combining a seal ring 26a in which a seal lip is attached to a metal ring having a reverse L-shaped cross section, and a slinger 26b constructed only by a metal ring having an L-shaped cross section. The seal ring 26a is fitted into a predetermined position on the inner circumferential surface of the outer ring 21 so as to be attached to the same position, and the slinger 26b is fitted into a predetermined position on the inner circumferential surface of the inner ring 24 so as to be attached to the same position. The seal member 26 is not limited to the structure mentioned above, but can generally employ various well-known seal members.

As shown in FIG. 1, the coupler ring 3 is constituted by a ring-shaped member, and is structured such that an inner circumferential spline 31 is formed in an inner circumferential surface, and an outer circumferential spline 32 is formed in an outer circumferential surface. The inner circumferential spline 31 is engaged with the spline 14 formed in the inner side end portion of the shaft portion 11. The coupler ring 3 is attached by being pressed to the inner side end surface of the second inner ring 23, in a state in which the inner circumferential spline 31 is engaged with the spline 14 of the shaft portion 11. In order to attach the coupler ring 3 to the second inner ring 23 while pressing as mentioned above, the caulked portion 15 is formed by plastically deforming the inner side end portion of the shaft portion 11 in the radial direction. The structure is made such that the pressing force to the vehicle outer side is applied to the coupler ring 3, the second inner ring 23 and the first inner ring 22, by forming the caulked portion 15. Further, it is possible to apply a predetermine preload to the coupler ring 3, the first inner ring 22 and the second inner ring 23 as well as ensuring fixing the coupler ring 3, the first inner ring 22 and the second inner ring 23 to the shaft portion 11, on the basis of the pressing force in the axial direction generated by the caulked portion 15.

Further, the coupler ring 3 forms one constituting element of a switching mechanism selectively allowing and shutting off the transmission of the driving force from the drive shaft 4. In order to form the switching mechanism, an end portion of the drive shaft 4 is arranged close to the coupler ring 3. Further, a spline 41 having the same diameter as an outer circumferential spline 32 of the coupler ring 3 is formed in an end portion of the drive shaft 4. The outer circumferential spline 32 and the spline 41 of the drive shaft 4 are arranged so as to be coaxial with each other. A spline 51 formed in an inner circumference of the gear ring 5 is engaged with the spline 41 of the drive shaft 4, and the gear ring 5 is slidable on the outer circumferential spline 32 and the spline 41 along an axial direction of the drive shaft 4. When moving the gear ring 5 to the vehicle outer side, the spline 51 of the gear ring 5 comes to a state (a state shown in FIG. 1) in which the spline 51 of the gear ring 5 is engaged with both of the spline 41 of the drive shaft 4 and the outer circumferential spline 32 of the coupler ring 3, whereby the transmission of the driving force from the drive shaft 4 to the inner shaft 1 is allowed. On the other hand, when moving the gear ring 5 to the vehicle inner side, the spline 51 of the gear ring 5 comes to a state (not shown) in which the spline 51 is engaged with the spline 41 of the drive shaft 4 but is not engaged with the outer circumferential spline 32 of the coupler ring 3, and the transmission of the driving force from the drive shaft 4 to the inner shaft 1 is shut off. As mentioned above, the transmission of the driving force from the drive shaft 4 to the inner shaft 1 is selectively allowed and shut off by sliding the gear ring 5 along the axial direction. Although an illustration is omitted, the gear ring 5 is driven by a sliding mechanism using appropriate driving means such as an air, a hydraulic pressure or the like.

In order to prevent the end surface of the spline portion of the coupler ring 3 from being brought into contact with the inner side end surface of the seal member 26 at a time of bringing the coupler ring 3 into contact with the inner side end surface of the second inner ring 23 so as to attach, an outer diameter d1 of the coupler ring 3 is set smaller than a diameter d2 of a shoulder portion 23c of the second inner ring 23. The seal member 26 is installed onto the shoulder portion 23c. In the present embodiment, and end surface of the seal member 26 is a side surface of the metal ring having the L-shaped cross section and constructing the slinger 26b. Further, the outer diameter d1 of the coupler ring 3 is a diameter of a virtual cylinder defined by a surface including a peak of a crest portion of the outer circumferential spline 32. In the present embodiment, it is possible to avoid the interference of the coupler ring 3 with the seal member 26 of the roller bearing 2 by setting the outer diameter d1 of the coupler ring 3 smaller than the diameter d2 of the shoulder portion 23c of the second inner ring 23 as mentioned above. In other words, in the wheel bearing apparatus in accordance with the present embodiment, as an avoiding structure for avoiding the interference of the coupler ring 3 with the seal member 26 of the roller bearing 2, there is employed a structure of setting the outer diameter d1 of the coupler ring 3 smaller than the diameter d2 of the shoulder portion 23c of the second inner ring 23.

In the wheel bearing apparatus having the structure mentioned above, the coupler ring 3 is attached as follows.

First, the double row tapered roller bearing corresponding to the roller bearing 2 is inserted to the outer circumference of the shaft portion 11 from the inner side end portion of the shaft portion 11, before caulking the inner side end portion of the shaft portion 11. Subsequently, the coupler ring 3 is fitted to the shaft portion 11 while engaging the inner circumferential spline 31 of the coupler ring 3 with the spline 14 formed in the inner side end portion of the shaft portion 11. Subsequently, the caulked portion 15 is formed by caulking the inner side end portion of the shaft portion 11, and the coupler ring 3, the first inner ring 22 and the second inner ring 23 are fixed in such a manner as to be pressed to the vehicle outer side. Accordingly, a predetermined preload is applied to the coupler ring 3, the first inner ring 22 and the second inner ring 23 as well as fixing the coupler ring 3, the first inner ring 22 and the second inner ring 23 to the shaft portion 11. At this time, since the outer diameter d1 of the coupler ring 3 is formed smaller than the diameter d2 of the shoulder portion 23c of the second inner ring 23, it is possible to avoid such an interference that a burr presses the end surface of the seal member 26 even if the burr is formed in the end surface of the outer circumferential spline 32.

If the end surface of the seal member 26 is pressed by the end surface of the coupler ring 3, the slinger 26b is pressed to an inner portion, and an interval between the seal ring 26a and the slinger 26b is changed, or the slinger 26b is deformed. Accordingly, there can be generated a case that the seal lip of the seal ring 26a is deformed, and the function of preventing the intrusion of foreign material by the seal member 26 is deteriorated. However, in the case of the present embodiment, the seal member 26 of the roller bearing 2 is not pressed and deformed by the end surface of the coupler ring 3. Accordingly, it is possible to elongate a service life of the roller bearing 2 without deteriorating the function of preventing the intrusion of the foreign material into the roller bearing 2 by the seal member 26.

Next, a description will be given of a wheel bearing apparatus in accordance with a second embodiment of the present invention with reference to FIG. 2. The same reference numerals are attached to the same elements as those of the wheel bearing apparatus in accordance with the first embodiment shown in FIG. 2, and a description thereof will be omitted.

The second embodiment is obtained by changing the avoiding structure mentioned above in the first embodiment. In the present embodiment, it is possible to avoid the interference of the coupler ring 3 with the seal member 26 by forming a protruding portion 231 in an inner side end surface of the second inner ring 23. In other words, in the wheel bearing apparatus in accordance with the present embodiment, as the avoiding structure for avoiding the interference of the coupler ring 3 with the seal member 26, there is employed the structure in which the protruding portion 231 is formed in the inner side end surface of the second inner ring 23. In accordance with the structure mentioned above, since the coupler ring 3 and the seal member 26 are arranged so as to be away from each other even if the end surface of the seal member 26 and the end surface of the outer circumferential spline 32 are opposed to each other in an assembled state, the seal member 26 is not interfered by the coupler ring 3.

In accordance with the wheel bearing apparatus on the basis of the second embodiment structured as mentioned above, in the same manner as the case of the first embodiment, the seal member 26 of the roller bearing 2 is not pressed by the end surface of the coupler ring 3 so as to be deformed. Accordingly, the function of preventing the intrusion of the foreign material into the roller bearing 2 by the seal member 26 is not deteriorated, but it is possible to elongate a service life of the roller bearing 2.

Further, in the case of the second embodiment, the dimension in the axial direction is enlarged at a degree of the provision of the protruding portion 231, it is not necessary to make an outer diameter d1 of the coupler ring 3 smaller than a diameter d2 of the shoulder portion 23c of the second inner ring 23 as is different from the case of the first embodiment. Accordingly, it becomes easy to suitably design and manufacture the outer circumferential spline 32 of the coupler ring 3 and the spline 41 of the drive shaft 4.

Next, a description will be given of a wheel bearing apparatus in accordance with a third embodiment of the present invention with reference to FIG. 3. The same reference numerals are attached to the same elements as those of the wheel bearing apparatus in accordance with the first embodiment shown in FIG. 3, and a description thereof will be omitted.

The third embodiment is obtained by changing the avoiding structure mentioned above in the first embodiment. In the present embodiment, it is possible to avoid the interference of the coupler ring 3 with the seal member 26 by forming a protruding portion 301 in an end surface of the coupler ring 3 opposing to the inner side end surface of the second inner ring 23. In other words, in the wheel bearing apparatus in accordance with the present embodiment, as the avoiding structure for avoiding the interference of the coupler ring 3 with the seal member 26, there is employed the structure in which the protruding portion 301 is formed in the end surface portion of the coupler ring 3 opposing to the inner side end surface of the second inner ring 23. The protruding portion 301 is formed by diagonally cutting a corner portion of the coupler ring 3 in such a manner as to include a part of the outer circumferential spline 32, as shown in FIG. 3. In accordance with the structure mentioned above, since the coupler ring 3 and the seal member 26 are arranged so as to be away from each other even if the end surface of the seal member 26 and the end surface of the outer circumferential spline 32 are opposed to each other in an assembled state, the seal member 26 is not interfered by the coupler ring 3.

Since the wheel bearing apparatus in accordance with the third embodiment structured as mentioned above is different from the wheel bearing apparatus in accordance with the second embodiment only in a point that the protruding portion 301 is provided in the coupler ring 3 in place of the provision of the protruding portion 231 in the second inner ring 23, it is possible to obtain the same advantage as the case of the second embodiment.

The first to third embodiments mentioned above may be modified as follows.

In the first to third embodiments, the first inner ring 22 of the roller bearing 2 may be integrated with the shaft portion 11.

In the first to third embodiments, a double row ball bearing may be employed as the roller bearing 2 in place of the double row tapered roller bearing. In this case, however, the use of the double row tapered roller bearing is suitable for a comparatively large-sized vehicle.

Figure 2:
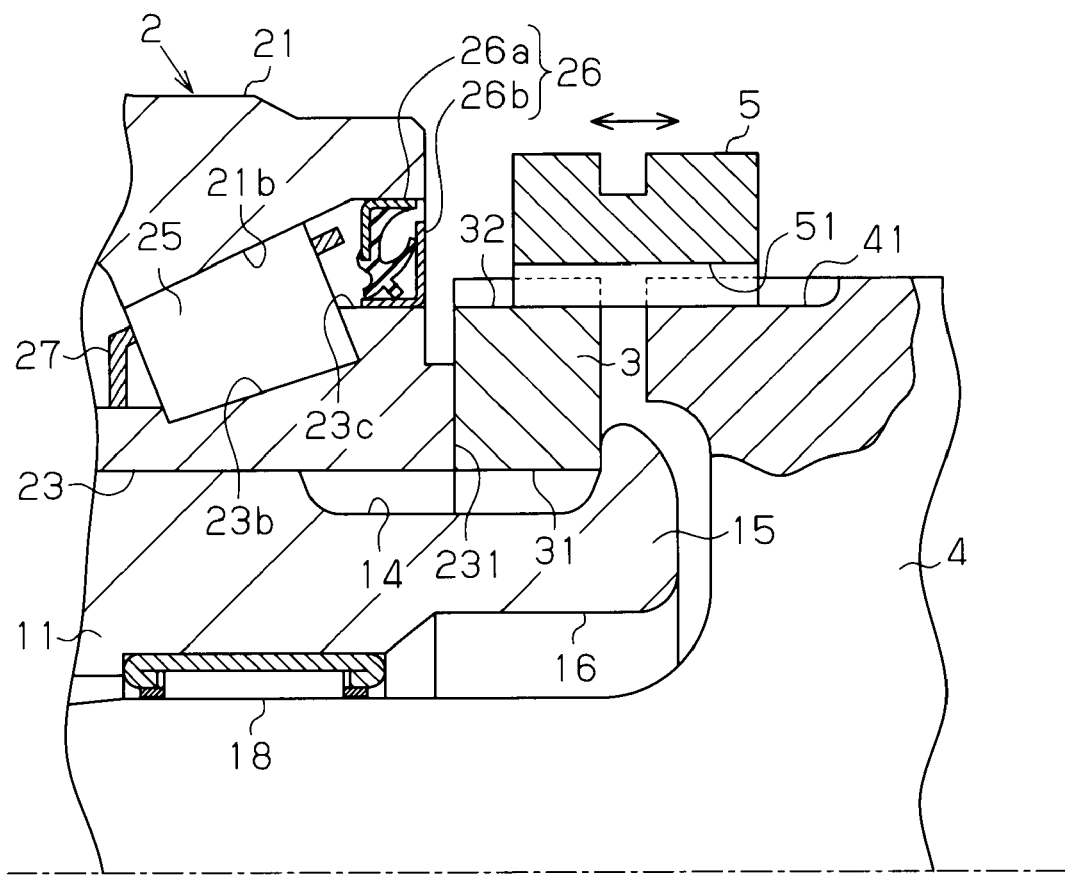
FIG. 2 is a cross-sectional view of a main portion of a wheel bearing apparatus in accordance with a second embodiment of the present invention.
Figure 3:
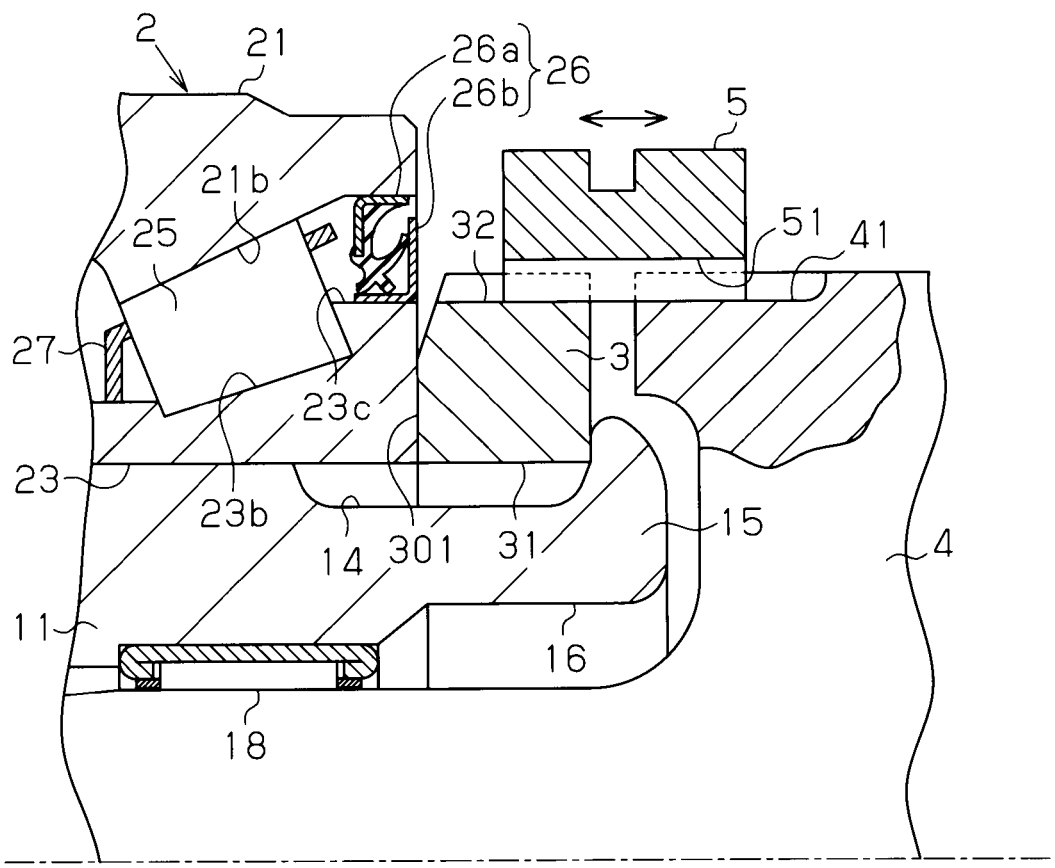
FIG. 3 is a cross-sectional view of a main portion of a wheel bearing apparatus in accordance with a third embodiment of the present invention.

In the second embodiment and the third embodiment, the shapes of the protruding portions 231 and 301 are not limited to those illustrated in FIGS. 2 and 3 as long as the protruding portions 231, 301 arrange the coupler ring 3 away from the seal member 26 and reliably transmit the pressing force in the axial direction from the coupler ring 3 to the second inner ring 23. For example, in the second embodiment, the protruding portion 231 may be formed by cutting the corner portion such as the third embodiment in place of forming the protruding portion 231 in the step shape. In the same manner, in the third embodiment, the protruding portion 301 may be formed in the step shape such as the second embodiment.

The structure may be made such that the portion in the vehicle inner side in the outer circumferential surface of the shell needle bearing 18 is away from the inner wall of the center hole 16.

Figure 4:
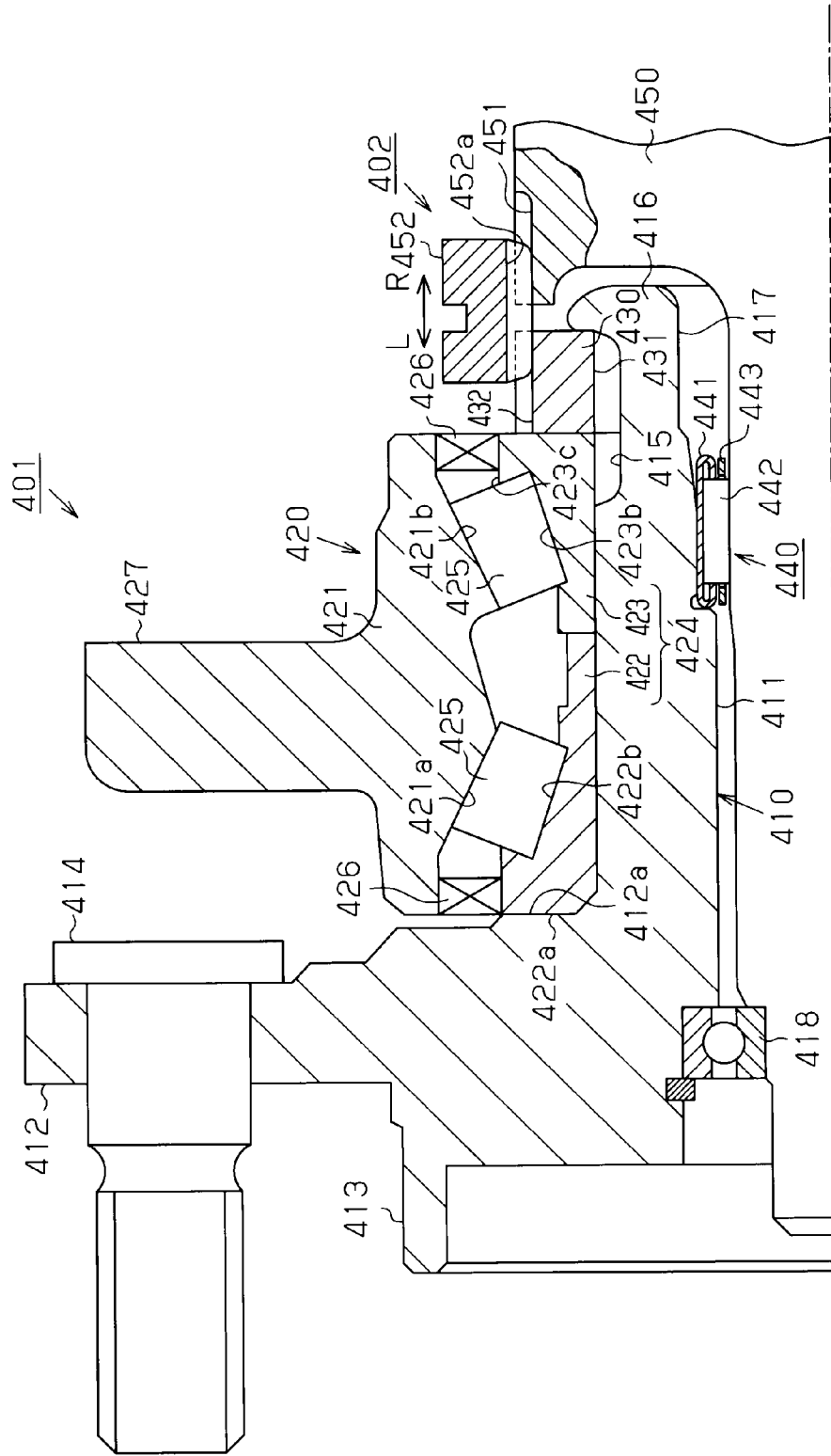
FIG. 4 is a longitudinal cross-sectional view of a wheel bearing apparatus in accordance with a fourth embodiment of the present invention.
Figure 5:
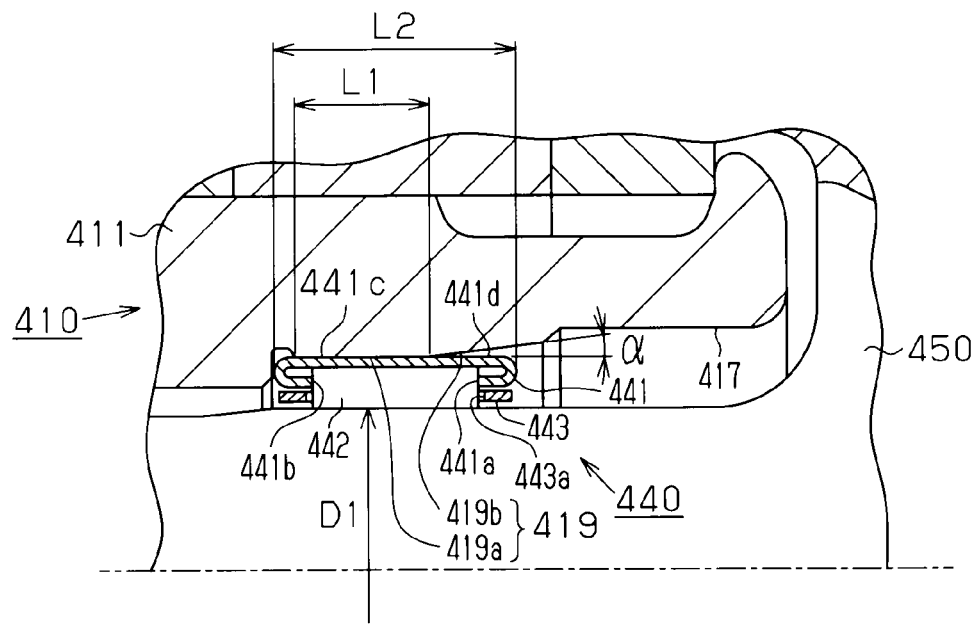
FIG. 5 is an enlarged cross-sectional view of a main portion of the wheel bearing apparatus in FIG. 4.

Next, a description will be given of a wheel bearing apparatus in accordance with a fourth embodiment of the present invention with reference to FIGS. 4 and 5. FIG. 4 is a longitudinal cross-sectional view of a wheel bearing apparatus 401. The wheel bearing apparatus 401 is provided with an inner shaft 410, a roller bearing 420, a coupler ring 430, and a needle bearing 440.

The inner shaft 410 has a shaft portion 411, an annular flange portion 412 formed in an outer side end portion of the shaft portion 411 in such a manner as to extend radially outward, and a cylindrical socket portion 413 protruding so as to protrude further to a vehicle outer side than the flange portion 412. A wheel (not shown) is fastened to the flange portion 412 by a bolt 414. A roller bearing 420 for rotatably supporting the inner shaft 410 with respect to a suspension apparatus of a vehicle body (not shown) is installed to an outer circumferential surface of a center portion in an axial direction of the shaft portion 411. A double row tapered roller bearing is used as the roller bearing 420. The double row tapered roller bearing is generally used for receiving a great radial load, axial load and moment load applied from the vehicle body having a great weight.

A spline 415 for fixing a coupler ring 430 is formed in an outer circumferential surface of an inner side end portion of the shaft portion 411. The coupler ring 430 structures a switching mechanism 402 selectively allowing and shutting off a transmission of a driving force from a drive shaft 450 as mentioned below. Further, a caulked portion 416 is provided in the inner side end portion of the shaft portion 411 in which the spline 415 is formed, by plastically deforming the end portion radially outward at a time of assembling.

A center hole 417 allowing insertion of the drive shaft 450 is formed in a center of the shaft portion 411. In the center hole 417, for the purpose of supporting the drive shaft 450, a ball bearing 418 is arranged in a vehicle outer side, and a needle bearing 440 serving as a bearing member is arranged in a vehicle inner side. A deep groove ball bearing is used as the ball bearing 418, and the ball bearing 418 is arranged at substantially the same axial position as the flange portion 412 of the inner shaft 410. Further, the needle bearing 440 is arranged at substantially the same axial position as the second inner ring 423 of the roller bearing 420. The inner shaft 410 and the drive shaft 450 are firmly supported in a coaxial state with each other on the basis of the provision of two bearings 418 and 440 as mentioned above, and a rigidity of the wheel bearing apparatus 401 is increased. Further, a thickness of the inner shaft 410 in the portion to which the bearing 440 is attached can be easily secured by setting the bearing in the vehicle inner side to the needle bearing 440.

The roller bearing 420 is constituted by a double row tapered roller bearing, and has an outer ring 421, an inner ring 424 constituted by a first inner ring 422 in a vehicle outer side and a second inner ring 423 in a vehicle inner side, tapered rollers 425 serving as a double row rolling element and arranged in the vehicle outer side and the vehicle inner side, and a seal member 426 arranged in the vehicle outer side and the vehicle inner side. An outer side end surface 422a of the first inner ring 422 is brought into contact with a radial surface 412a positioned near a base portion of the flange portion 412 of the inner shaft 410. The second inner ring 423 is arranged adjacent to the vehicle inner side of the first inner ring 422. The first inner ring 422 has a first inner ring track 422b corresponding to a track surface of the tapered rollers 425 in the vehicle outer side, and the second inner ring 423 has a second inner ring track 423b corresponding to a track surface of the tapered rollers 425 in the vehicle inner side.

On the other hand, the outer ring 421 has a first outer ring track 421a opposing to the first inner ring track 422b, and a second outer ring track 421b opposing to the second inner ring track 423b. Further, a flange portion 427 extending radially outward is provided in an outer circumferential surface of the outer ring 421. The flange portion 427 is attached to the suspension apparatus of the vehicle body. Tapered rollers 425 in the vehicle outer side are arranged between the first inner ring track 422b and the first outer ring track 421a, and the tapered rollers 425 in the vehicle inner side are arranged between the second inner ring track 423b and the second outer ring track 421b.

The seal member 426 is interposed between the outer ring 421 and the inner ring 424, and prevents the foreign material such as the muddy water, the gravel, the pebble or the like from making an intrusion into an inner portion of the roller bearing 420 from a gap between the outer ring 421 and the inner ring 424 in accordance with the travel of the vehicle. The seal member 426 is installed onto a shoulder portion 423c of the second inner ring 423.

The coupler ring 430 is constituted by a ring-shaped member, and is structured such that an inner circumferential spline 431 is formed in an inner circumferential surface, and an outer circumferential spline 432 is formed in an outer circumferential surface. The inner circumferential spline 431 is structured such as to be engaged with a spline 415 formed in the inner side end portion of the shaft portion 411, and the coupler ring 430 and the inner shaft 410 are coupled so as to be integrally rotatable on the basis of a spline engagement. Further, the coupler ring 430 is fixed so as to be immobile in the axial direction of the inner shaft 410 by a caulked portion 416 formed by caulking the shaft end of the shaft portion 411. The shaft end caulking is executed by pressing a caulking jig to the shaft end of the shaft portion 411 from the inner side. Accordingly, since the pressure is applied along the axial direction of the shaft portion 411 from the caulked portion 416 toward the outer side, it is possible to reliably fix the inner ring 424 and the coupler ring 430 to the shaft portion 411 of the coupler ring 430, and a preload is applied to the inner ring 424 and the coupler ring 430.

Further, the coupler ring 430 forms one constituting element of a switching mechanism 402 selectively allowing and shutting off a transmission of the driving force from the drive shaft 450. The switching mechanism 402 is provided with a coupler ring 430, a drive shaft 450, and a gear ring 452 serving as a clutch member. The drive shaft 450 has an end portion which is close to the coupler ring 430, and a spline 451 having the same diameter as the outer circumferential spline 432 of the coupler ring 430 is formed in the end portion. The outer circumferential spline 432 and the spline 451 are arranged coaxially with each other. A spline 452a formed in an inner circumference of a gear ring 452 is engaged with the spline 451, and the gear ring 452 is slidable on the outer circumferential spline 432 and the spline 451 along the axial direction of the drive shaft 450. If the gear ring 452 moves to the outer side, that is, moves in a direction of arrow L shown in FIG. 4, the spline 452a of the gear ring 452 comes to a state (a state shown in FIG. 4) in which the spline 452a is engaged with both of the spline 451 of the drive shaft 450 and the outer circumferential spline 432 of the coupler ring 430, the transmission of the driving force from the drive shaft 450 to the inner shaft 410 is allowed, and the tire serves as the drive wheel. On the other hand, if the gear ring 452 moves to the inner side, that is, moves in a direction of arrow R in FIG. 4, the spline 452a of the gear ring 452 comes to a state (not shown) in which the spline 452a is engaged with the spline 451 of the drive shaft 450 but is not engaged with the outer circumferential spline 432 of the coupler ring 430, the transmission of the driving force from the drive shaft 450 to the inner shaft 410 is shut off, and the tire serves as a coasting wheel. As mentioned above, the transmission of the driving force from the drive shaft 450 to the inner shaft 410 is selectively allowed and shut off by sliding the gear ring 452 in the axial direction. The gear ring 452 is driven by a sliding mechanism using appropriate driving means such as an air, a hydraulic pressure or the like, which is not particularly illustrated.

The needle bearing 440 is provided with a shell 441, a plurality of needle rollers 442 and a retainer 443. FIG. 5 is an enlarged cross-sectional view around the needle bearing 440. The shell 441 is formed in an annular shape, and is folded back in both ends in the axial direction. The folded-back distal end portions 441a and 441b are positioned so as to oppose to each other, and a width between the distal end portion 441a and the distal end portion 441b becomes substantially the same as an axial length of the needle roller 442. Further, the needle roller 442 is held by the distal end portion 441a and the distal end portion 441b so as to be immovable in the axial direction. The retainer 443 is formed in an annular shape, and has a pocket hole 443a at a position corresponding to the needle roller 442. A width in a circumferential direction of the pocket hole 443a becomes smaller than a diameter of the needle roller 442, thereby preventing the needle roller 442 from coming off to an inner circumferential side.

The needle bearing 440 is attached to the inner shaft 410 by press fitting the needle bearing 440 to the center hole 417 and engaging the shell 441 with the inner wall 419 of the center hole 417, and rotatably supports the drive shaft 450 by the needle roller 442. In this case, the portion of the inner wall 419 of the center hole 417 opposing to the outer circumferential surface of the needle bearing 440 has an outer side portion 419a having a cylindrical surface shape, and an inner side portion 419b having a conical surface shape and expanding toward the inner side of the vehicle at an inclination angle α with respect to a center axis of the center hole 417. Accordingly, in the needle bearing 440 arranged within the center hole 417, an outer circumferential surface 441c in an outer side of the shell 441 is engaged with the outer side portion 419a of the inner wall 419, and an outer circumferential surface 441d in an inner side of the shell 441 is away from the inner side portion 419b of the inner wall 419.

Accordingly, even if a bulge is generated in the inner wall 419 of the center hole 417 at a time of executing the shaft end caulking mentioned above by pressing the caulking jig against the shaft end of the shaft portion 411 in the axial direction, the inner side portion 419b of the inner wall 419 is away from the outer circumferential surface 441d in the inner side of the shell 441. Therefore, it is possible to inhibit an influence of the bulge of the inner wall 419 from being exerted on the needle bearing 440. In other words, it is possible to prevent the inscribed circle diameter D1 of the needle roller 442 from being changed due to the deformation of the needle bearing 440 on the basis of the bulge of the inner wall 419. It is preferable that the inclination angle α of the inner side portion 419b of the inner wall 419 is between 20 and 60 minutes. It is possible to effectively inhibit the influence of the bulge of the inner wall 419 from being exerted on the needle bearing 440 while suppressing a reduction of a strength of the inner shaft 410 by setting the inclination angle α to 20 to 60 minutes. Further, it is preferable that an engagement length L1 between the outer circumferential surface 441c in the outer side of the shell 441 and the outer side portion 419a of the inner wall 419 is equal to or more than one half of an axial length L2 of the needle bearing 440. Accordingly, it is possible to inhibit the fixation of the needle bearing 440 with respect to the inner wall 419 from becoming unstable.

Next, a description will be given of a procedure of attaching the roller bearing 420 and the coupler ring 430 to the inner shaft 410 and assembling the needle bearing 440.

First, prior to the execution of the shaft end caulking, the roller bearing 420 is inserted to the outer circumference of the shaft portion 411 from the inner side end portion of the shaft portion 411. Subsequently, the coupler ring 430 is fitted to the shaft portion 411 while engaging the inner circumferential spline 431 of the coupler ring 430 with the spline 415 formed in the inner side end portion of the shaft portion 411. Subsequently, the caulked portion 416 is formed by executing the shaft end caulking of the shaft portion 411, thereby fixing the first inner ring 422 and the second inner ring 423 of the roller bearing 420 and the coupler ring 430 in such a manner as to press to the vehicle outer side. Accordingly, the roller bearing 420 and the coupler ring 430 are fixed to the shaft portion 411, and a preload necessary for the roller bearing 420 and the coupler ring 430 is applied.

Next, the needle bearing 440 is press fitted to the center hole 417 of the inner shaft 410 from the vehicle inner side, and the shell 441 of the needle bearing 440 is engaged with the inner wall 419 of the center hole 417. At this time, even if the bulge is generated in the inner wall 419 of the center hole 417 due to the shaft end caulking, the inner side portion 419b of the inner wall 419 is away from the outer circumferential surface 441d in the vehicle inner side of the shell 441, whereby the influence of the bulge of the inner wall 419 is exerted on the needle bearing 440, thereby inhibiting the needle bearing 440 from being deformed. Even in the case of employing such a procedure as to attach the bearing 420 and the coupler ring 430 after assembling the needle bearing 440 in the inner shaft 410, it is possible to inhibit the influence of the bulge of the inner wall 419 caused by the shaft end caulking from being exerted on the needle bearing 440.

In accordance with the wheel bearing apparatus 401 on the basis of the fourth embodiment, the following advantages can be obtained.

In the fourth embodiment, the outer circumferential surface 441d in the vehicle inner side of the shell 441 of the needle bearing 440 is away from the inner wall 419 of the center hole 417. Accordingly, even if the bulge is generated in the inner wall 419 by the shaft end caulking, it is possible to prevent the inscribed circle diameter D1 of the needle roller 442 from being changed by the deformation of the needle bearing 440, and it is possible to inhibit the overload in the radial direction from being applied to the drive shaft 450. Therefore, it is possible to preferably suppress a deterioration of a fuel consumption caused by the deformation of the needle bearing 440 and a deterioration of a durability of the needle bearing 440 and the drive shaft 450.

In the fourth embodiment, since the inner side portion 419b of the inner wall 419 opposing to the outer circumferential surface 441d in the vehicle inner side of the needle bearing 440 is constituted by the conical surface which is expanded toward the vehicle inner side, it is possible to smoothly guide the shell 441 of the needle bearing 440 by the inner side portion 419b at a time of assembling the needle bearing 440 in the inner shaft 410.

In the fourth embodiment, the inclination angle α of the inner side portion 419b of the inner wall 419 is between 20 and 60 minutes. Accordingly, it is possible to prevent the strength of the shaft portion 411 from being largely lowered due to an unnecessary greatness of the inclination angle α. Further, it is possible to inhibit the influence of the bulge of the inner wall 419 generated by the shaft end caulking from being exerted on the needle bearing 440 due to a too much smallness of the inclination angle α.

In the fourth embodiment, the needle bearing 440 is used. The needle bearing 440 has an advantage that a friction loss generated between the needle bearing 440 and the drive shaft 450 is small.

The fourth embodiment may be modified as follows.

Figure 6:
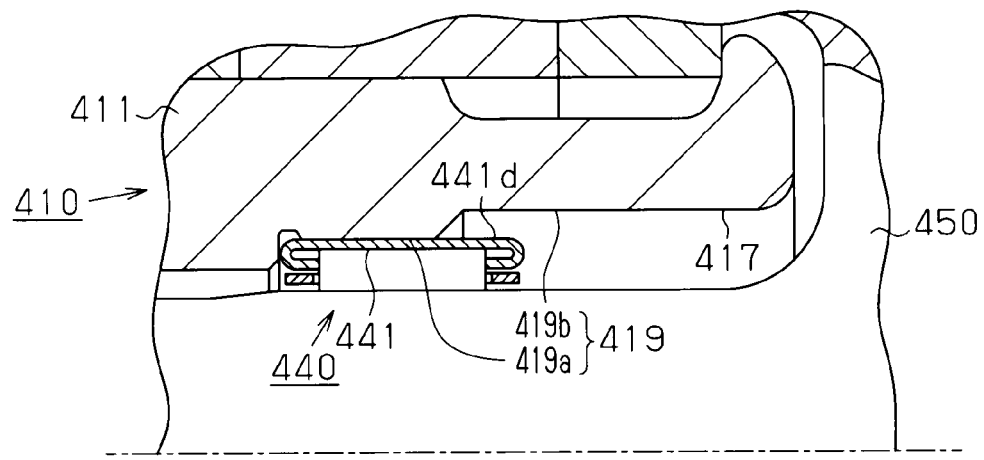
FIG. 6 is a cross-sectional view of a main portion showing a modified embodiment of the wheel bearing apparatus in FIG. 4.
Figure 7:
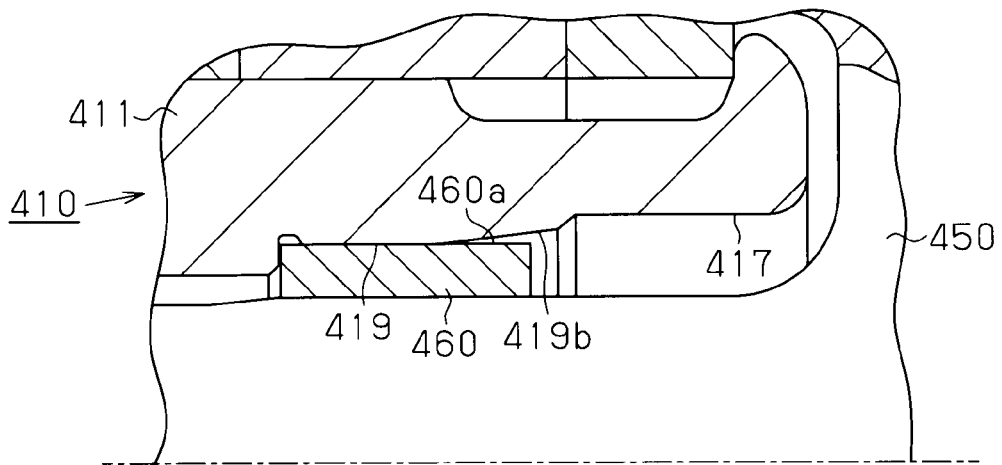
FIG. 7 is a cross-sectional view of a main portion showing a modified embodiment of the wheel bearing apparatus in FIG. 4.

In the fourth embodiment, the inner side portion 419b of the inner wall 419 is formed as the conical surface expanded toward the inner side, however, the shape of the inner side portion 419b may be changed as long as the inner side portion 419b is away from the outer circumferential surface 441d in the inner side of the shell 441. For example, as shown in FIG. 6, the inner side portion 419b of the inner wall 419 may be constituted by a cylindrical surface having a larger diameter than the outer side portion 419a.

In the fourth embodiment, the needle bearing 440 is used for supporting the drive shaft 450 with respect to the inner shaft 410, however, for example, it is possible to employ a metal cylindrical sliding bearing 460 in place of the needle bearing 440. Even in the case of using the sliding bearing 460, it is possible to suppress the deformation of the sliding bearing 460 by making the outer circumferential surface 460a in the inner side of the sliding bearing 460 away from the inner side portion 419b of the inner wall 419. In the wheel bearing apparatus 401 in accordance with the fourth embodiment, in the case that the spline 452a of the gear ring 452 is engaged with both of the spline 451 of the drive shaft 450 and the outer circumferential spline 432 of the coupler ring 430, whereby the wheel serves as the drive wheel, the inner shaft 410 and the drive shaft 450 are integrally rotated. On the other hand, in the case that the spline 452a of the gear ring 452 is engaged with the spline 451 of the drive shaft 450 but is not engaged with the outer circumferential spline 432 of the coupler ring 430, whereby the wheel serves as a coasting wheel, the inner shaft 410 and the drive shaft 450 are hardly rotated relatively except at a cornering travel time or the like, and even if they are rotated relatively, a rotating amount is slight. Accordingly, a scene achieving an essential function of the needle bearing 440 of rolling while being exposed to the load is limited. However, it is possible to achieve a cost reduction of the bearing parts while ensuring a minimum bearing function by using the sliding bearing 460 in place of the needle bearing 440.

Figure 8:
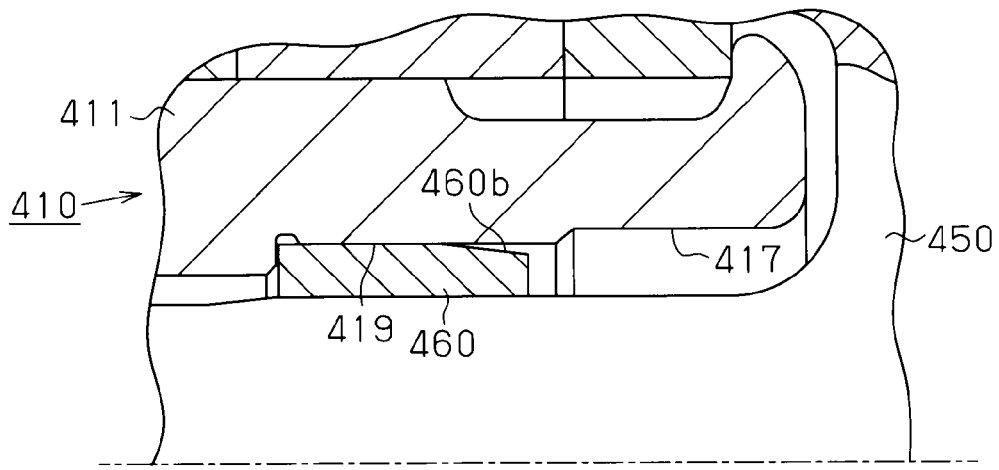
FIG. 8 is a cross-sectional view of a main portion showing a modified embodiment of the wheel bearing apparatus in FIG. 4.

Further, in the case of using the sliding bearing 460 for supporting the drive shaft 450, the structure may be made such as to make the outer circumferential surface in the inner side of the sliding bearing 460 away from the inner wall 419 by reducing a thickness of the outer circumferential portion 460b in the inner side of the sliding bearing 460, as shown in FIG. 8. In this case, it is possible to inhibit the influence of the bulge of the inner wall 419 caused by the shaft end caulking from being exerted on the sliding bearing 460 while preventing the reduction of the strength of the shaft portion 411 of the inner shaft 410.

In the fourth embodiment, the inner ring 424 of the roller bearing 420 is constituted by the first inner ring 422 and the second inner ring 423. However, the first inner ring 422 may be integrated with the shaft portion 411 of the inner shaft 410.

In the fourth embodiment, the double row tapered roller bearing is used as the roller bearing 420. However, a double row ball bearing may be used in place of the double row tapered roller bearing.

In order to avoid the interference of the coupler ring 430 with the seal member 426, an outer diameter of the coupler ring 430 may be set smaller than a diameter of the shoulder portion 423c.

In order to avoid the interference of the coupler ring 430 with the seal member 426, a protruding portion may be provided in any one of opposing end surfaces of the coupler ring 430 and the second inner ring 423, whereby the coupler ring 430 may be arranged away from the seal member 426.

Next, a description will be given of a wheel bearing apparatus in accordance with a fifth embodiment of the present invention with reference to FIG. 9.

Figure 9:
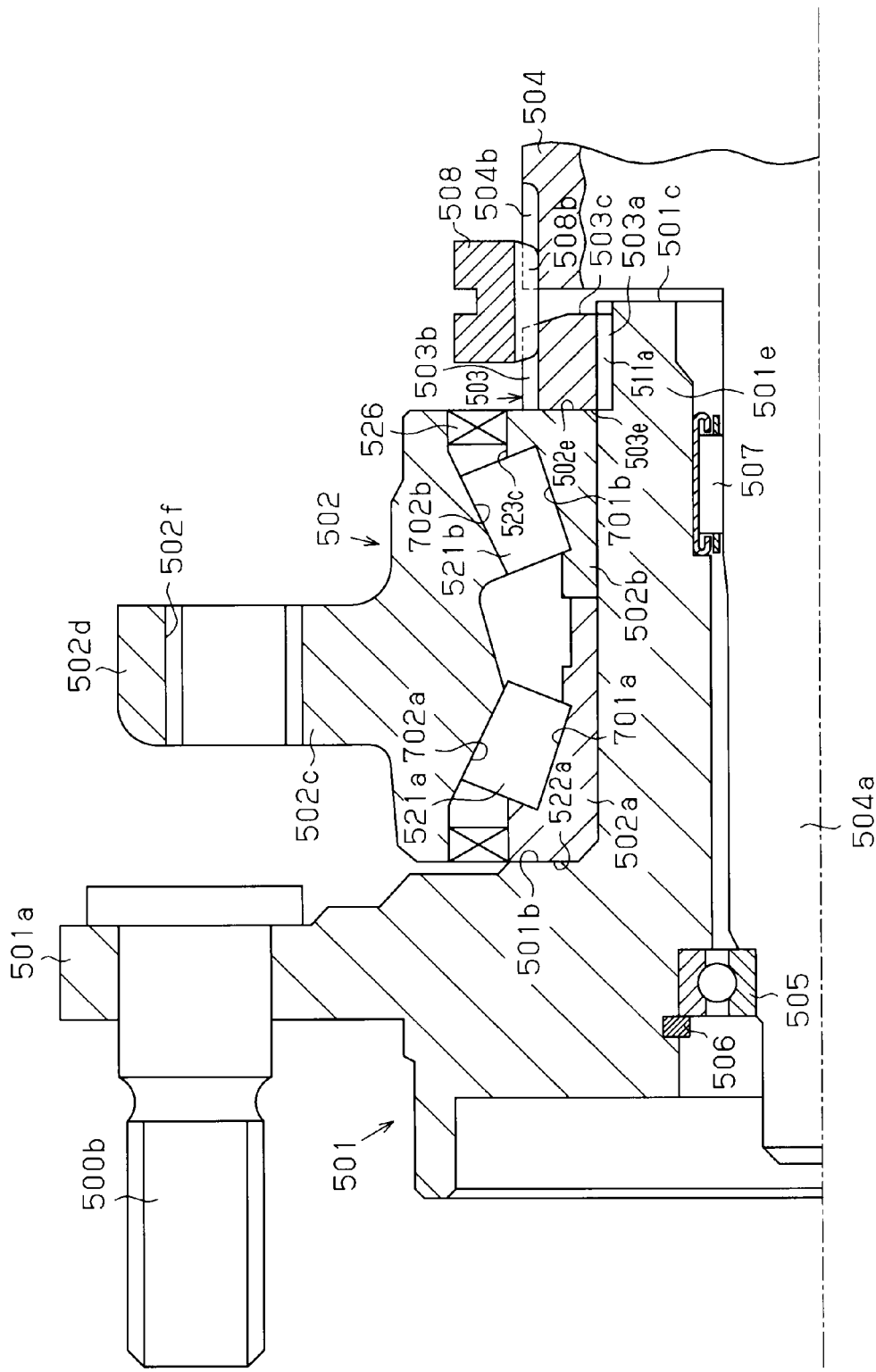
FIG. 9 is a longitudinal cross-sectional view showing a double row tapered roller bearing apparatus in accordance with a fifth embodiment of the present invention.

As shown in FIG. 9, a disc-shaped or cross-shaped flange portion 501a is provided in an outer circumferential surface of an end portion in a vehicle outer side (a left side in FIG. 9) of a hub shaft 501 in such a manner as to extend radially outward. The wheel (not shown) is fastened to the flange portion 501a via a bolt 500b. Further, an external thread portion 511a into which a coupler ring 503 mentioned below is screwed is formed in an outer circumferential surface of an end portion 501e in a vehicle inner side (a right side in FIG. 9) of the hub shaft 501. FIG. 9 shows a wheel bearing apparatus arranged in a left side of a vehicle such as a motor vehicle or the like, and in the drawing, the external thread portion 511a is formed as a right-handed screw in such a manner that the coupler ring 503 is fastened into the hub shaft 501 in accordance with a forward movement of the vehicle. An internal thread portion 503a formed in an inner circumferential surface of the coupler ring 503 in the drawing is also formed as a right-handed screw.

A double row tapered roller bearing 502 is fitted about an outer circumferential surface of a center portion in an axial direction of the hub shaft 501 for rotatably supporting the hub shaft 501 to the suspension apparatus of the vehicle (not shown).

An inner ring of the double row tapered roller bearing 502 is constituted by a first inner ring member 502a in a vehicle outer side and a second inner ring member 502b in a vehicle inner side. A vehicle outer side end surface 522a of the first inner ring member 502a is in surface contact with a vehicle inner side end surface 501b of a flange portion 501a of the hub shaft 501. The second inner ring member 502b is arranged in adjacent to the vehicle inner side of the first inner ring member 502a. The first inner ring member 502a has a first inner ring track 701a corresponding to a track surface of a first row of tapered rollers 521a, and the second inner ring member 502b has a second inner ring track 701b corresponding to a track surface of a second row of tapered rollers 521b.

An outer ring 502c of the double row tapered roller bearing 502 has a first outer ring track 702a opposing to the first inner ring track 701a, and a second outer ring track 702b opposing to the second inner ring track 701b. A flange portion 502d is provided in an outer circumferential surface of the outer ring 502c in such a manner as to extend radially outward. A bolt hole 502f used for attaching to the suspension apparatus of the vehicle body is formed in the flange portion 502d.

A ball bearing 505 and a needle roller bearing 507 are interposed between the hub shaft 501, and an axle 504a provided in an inner side end surface of a joint outer ring 504 serving as an outer ring of a constant velocity universal joint, and the ball bearing 505 and the needle roller bearing 507 rotatably support the hub shaft 501 with respect to the axle 504a. A deep groove ball bearing is used for the ball bearing 505, and is arranged at substantially the same axial position as the flange portion 501a of the hub shaft 501 in such a manner as to be regulated its movement in an axial direction by a stop ring 506. The needle roller bearing 507 is arranged in the vehicle inner side than the ball bearing 505, more particularly, at substantially the same axial position as the second inner ring member 502b of the double row tapered roller bearing 502 provided in the outer circumferential surface of the hub shaft 501. The hub shaft 501 and the axle 504a are firmly supported in a coaxial state with each other by the provision of these two bearings 505 and 507. Further, the thickness of the hub shaft 501 in the portion to which the bearing 507 is attached can be easily secured by constituting the bearing in the vehicle inner side by the needle roller bearing 507.

The coupler ring 503 corresponding to the ring-shaped member is provided in the vehicle inner side of the second inner ring member 502b of the double row tapered roller bearing 502 mentioned above. The coupler ring 503 is brought into contact with an end surface 502e in the vehicle inner side of the second inner ring member 502b. A spline groove 503b is formed in an outer circumferential surface of the coupler ring 503, and the internal thread portion 503a is formed in the inner circumferential surface of the coupler ring 503 as mentioned above. The external thread portion 511a is formed in the outer circumferential surface of the end portion 501e in the vehicle inner side of the hub shaft 501 as mentioned above. Further, the coupler ring 503 is installed to the hub shaft 501 in accordance with a screwing in such a manner as to press the second inner ring member 502b along the axial direction of the hub shaft 501 toward the end surface 501b in the vehicle inner side of the flange portion 501a. Describing in detail, the coupler ring 503 strongly presses the second inner ring member 502b toward the end surface 501b of the flange portion 501a via the first inner ring member 502a which is adjacent to the second inner ring member 502b, by fastening the internal thread portion 503a of the coupler ring 503 to the external thread portion 511f the hub shaft 501. On the basis of the fastening force from the coupler ring 503, the coupler ring 503 and the first and second inner ring members 502a and 502b are reliably fixed to the hub shaft 501.

A joint outer ring spline groove 504b having the same diameter and the same shape as those of the outer circumferential spline groove 503b of the coupler ring 503 is arranged in an outer circumferential surface of the joint outer ring 504 near the coupler ring 503. The outer circumferential spline groove 503b and the joint outer ring spline groove 504b are arranged coaxially with each other. In a state in which a spline groove 508b formed in an inner circumferential surface of a ring-shaped gear ring 508 is engaged with both of the outer circumferential spline groove 503b and the joint outer ring spline groove 504b (a state shown in FIG. 9), a rotational driving force of the axle 504a is transmitted to the hub shaft 501. On the other hand, if the gear ring 508 is moved to the vehicle inner side (a right side in FIG. 1), the spline groove 508b of the gear ring 508 comes to a state (not shown) in which the spline groove 508b is engaged with the joint outer ring spline groove 504b but is not engaged with the outer circumferential spline groove 503b of the coupler ring 503, and the rotational driving force of the axle 504a is not transmitted to the hub shaft 501. As mentioned above, the transmission of the driving force from the axle 504a to the hub shaft 501 is selectively allowed and shut off by sliding the gear ring 508 along the axial direction. In this case, the gear ring 508 is driven by the sliding mechanism using appropriate driving means such as air, hydraulic pressure or the like, which is not particularly illustrated.

Next, a description will be given of an assembling method of the wheel bearing apparatus in accordance with the fifth embodiment, particularly a procedure of screwing the coupler ring 503 to the hub shaft 501.

First, the double row tapered roller bearing 502 is inserted to the outer side of the hub shaft 501 from the end portion 501e in the vehicle inner side of the hub shaft 501. Next, the coupler ring 503 is installed to the end portion 501e of the hub shaft 501 while engaging the internal thread portion 503a of the coupler ring 503 with the external thread portion 511a of the hub shaft 501.

An outer diameter of the external thread portion 511a provided in the end portion 501e of the hub shaft 501 is substantially the same as an inner diameter of the internal thread portion 503a of the coupler ring 503. The end portion 501e of the hub shaft 501 is formed in such a shape as to allow the installation of the first inner ring member 502a and the second inner ring member 502b to the hub shaft 501. Further, the end portion 501e of the hub shaft 501 protrudes slightly to the vehicle inner side than the end surface 503c of the coupler ring 503 at a time of screwing the coupler ring 503 until being brought into contact with the second inner ring member 502b.

In the fifth embodiment, the coupler ring 503 is installed in such a manner as to be fastened to the hub shaft 501 in accordance with the rotation of the joint outer ring 504 (the axle 504a) at a time when the vehicle moves forward. In other words, in the wheel roller bearing apparatus arranged in the left side of the vehicle, the internal thread portion 503a of the coupler ring 503 and the external thread portion 511a of the hub shaft 501 are constituted by a right-handed screw, and in the wheel roller bearing apparatus arranged in the right side of the vehicle, the internal thread portion 503a and the external thread portion 511a are constituted by a left-handed screw. Accordingly, in the case that the vehicle moves forward, the coupler ring 503 is not rotated in a direction of loosening with respect to the hub shaft 501, and it is possible to prevent the coupler ring 503 from loosening and coming off. In this case, since a frequency of a forward moving is overwhelmingly higher than a frequency of a backward moving generally in the vehicle, the structure mentioned above is advantageous in this regard.

In accordance with the double row tapered roller bearing apparatus of the fifth embodiment, the following advantages can be obtained.

In the fifth embodiment, the coupler ring 503 is fixed to the hub shaft 501 in such a manner as to press the second inner ring member 502b of the double row tapered roller bearing 502 in the axial direction toward the flange portion 501a, by fastening the internal thread portion 503a of the coupler ring 503 to the external thread portion 511a of the end portion 501e of the hub shaft 501. Further, the preload is accordingly applied suitably to the double row tapered roller bearing 502. Describing in detail, the first and second inner ring members 502a and 502b forming the double row outside structure are fastened respectively from back surfaces, on the basis of the pressing force applied to the second inner ring member 502b by the coupler ring 503 and the reaction force from the end surface 501b of the flange portion 501a. As a result, the tapered rollers 521a and 521b are elastically deformed by receiving the pressure through the first and second outer ring tracks 702a and 702b from the outer ring 502c formed in the cylindrical shape and at a high rigidity, and an effective gap is adjusted. In the fifth embodiment, as shown in FIG. 9, the end surface 502e of the second inner ring member 502b and the end surface 503e of the coupler ring 503 come into surface contact with each other. Accordingly, the pressing force generated by fastening the coupler ring 503 to the hub shaft 501 is more uniformly applied to the second inner ring member 502b along the axial direction. In accordance with the structure mentioned above, it is possible to simply and reliably apply the preload for setting a negative internal gap in the double row tapered roller bearing 502 to the double row tapered roller bearing 502. As a result, it is possible to provide the double row tapered roller bearing apparatus in which a high bearing rigidity and a preventive measures for the vibration and the abnormal noise can be ensure.

In the fifth embodiment, the preload is applied to the double row tapered roller bearing 502 by fastening the internal thread portion 503a of the coupler ring 503 to the external thread portion 511a of the end portion 501e of the hub shaft 501. In the case of applying the preload to the double row tapered roller bearing 502 by caulking the end portion 501e in the vehicle inner side of the hub shaft 501, the coupler ring 503 is pressed radially outward by a component force in the radial direction in accordance with the caulking, and a strain expanding in the radial direction tends to be generated in the coupler ring 503. However, in the present embodiment, since the fastening of the coupler ring 503 is used in place of the shaft end caulk, the strain mentioned above can be effectively suppressed. Accordingly, no gap is generated in an engagement portion between the spline groove 503b of the coupler ring 503 and the spline groove 508b of the gear ring 508, and the coupler ring 503 and the joint outer ring 504 are operationally coupled firmly. As a result, the driving force of the vehicle can be effectively transmitted to the wheel via the wheel roller bearing apparatus.

In the wheel roller bearing apparatus in accordance with the fifth embodiment, the coupler ring 503 is not fixed to the double row tapered roller bearing 502 on the basis of the caulking of the end portion 501e of the hub shaft 501. Accordingly, it is possible to omit a step and an equipment required for the shaft end caulking, and it is possible to achieve a reduction of the assembling cost of the double row tapered roller bearing apparatus.

Since the bearing 502 in accordance with the fifth embodiment is constituted by the double row outside tapered roller bearing, it is possible to receive a great load in the circumferential direction and the axial direction even if a size is small. Accordingly, the fifth embodiment is effective for making the double row tapered roller bearing apparatus compact and light, and an effect of improving a fuel consumption is enlarged particularly in the case of being used for the drive wheel.

In this case, the fifth embodiment mentioned above may be modified as follows.

Figure 10A:
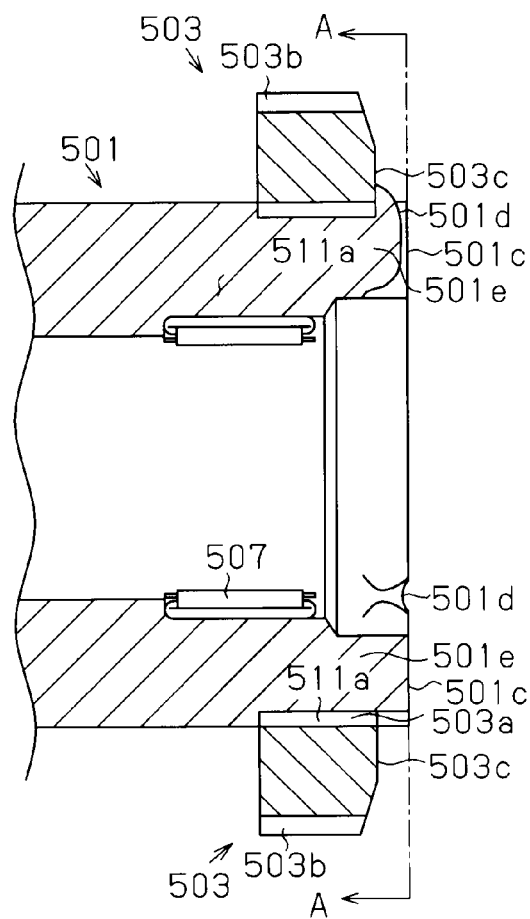
FIG. 10(a) is a cross-sectional view of a main portion showing a modified embodiment of the double row tapered roller bearing apparatus in FIG. 9.
Figure 10B:
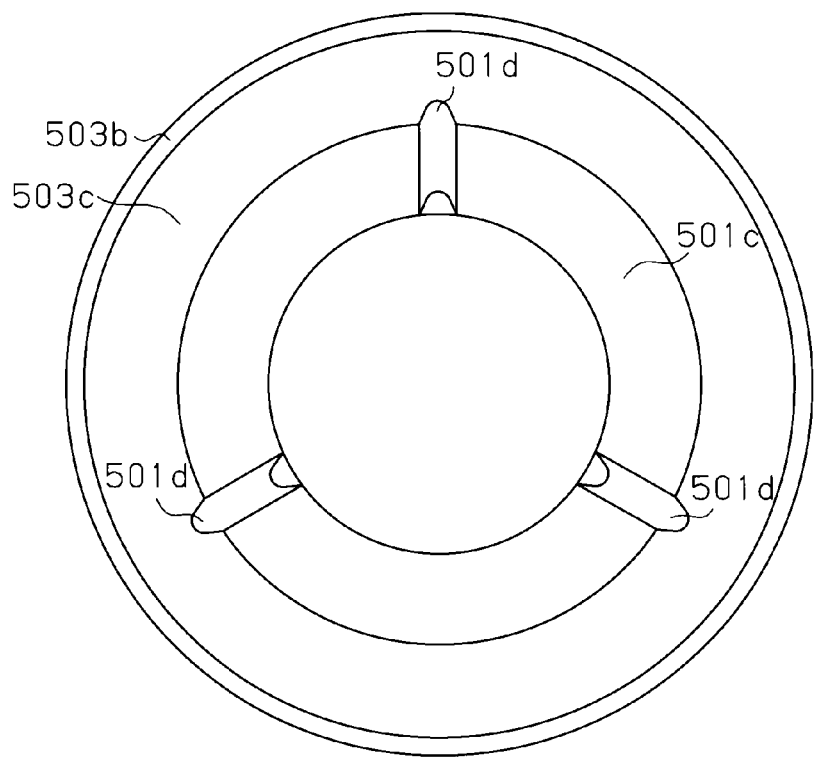
FIG. 10(b) is an end elevational view taken along line A-A in FIG. 10(a) in which an internal structure is omitted.

In the fifth embodiment, a static structure for preventing the coupler ring 503 from coming off is achieved by installing the coupler ring 503 to the hub shaft 501 without setting anything to the hub shaft 501. However, as shown in FIGS. 10(a) and 10(b), protruding portions 501d for preventing the coupler ring 503 from coming off may be provided in the end surface 501c in the vehicle inner side of the hub shaft 501 at a uniform angle interval (at about 120 degree in FIG. 10(b)) in the circumferential direction. Each of the protruding portions 501d is formed by beating the external thread portion 511a of the end portion 501e of the hub shaft 501 protruding further outward than the end surface 503c of the coupler ring 503 by a suitable jig such as a hammer or the like so as to protrude radially outward. On the basis of the protruding portion 501d, the slack of the coupler ring 503 is effectively prevented in the case that the vehicle moves backward. In order to more effectively prevent the slack of the coupler ring 503, it is preferable to bring each of the protruding portions 501d into contact with a reduced-diameter region of the end surface 503c of the coupler ring 503, as shown in FIGS. 10(a) and 10(b). Accordingly, it is possible to effectively prevent the coupler ring 503 from being loosened from the end portion 501e of the hub shaft 501 so as to change the preload applied to the double row tapered roller bearing 502 particularly in the case that the vehicle moves backward. In FIG. 10(b), there is shown an example in which three protruding portions 501d are formed at the uniform angle interval, however, two or four or more protruding portions 501d may be formed at a uniform angle interval as long as the slack and the come-off of the coupler ring 503 can be effectively prevented. Further, as long as the slack of the coupler ring 503 can be effectively prevented, the protruding portion 501d may not be necessarily arranged at the uniform angle interval.

Figure 11:
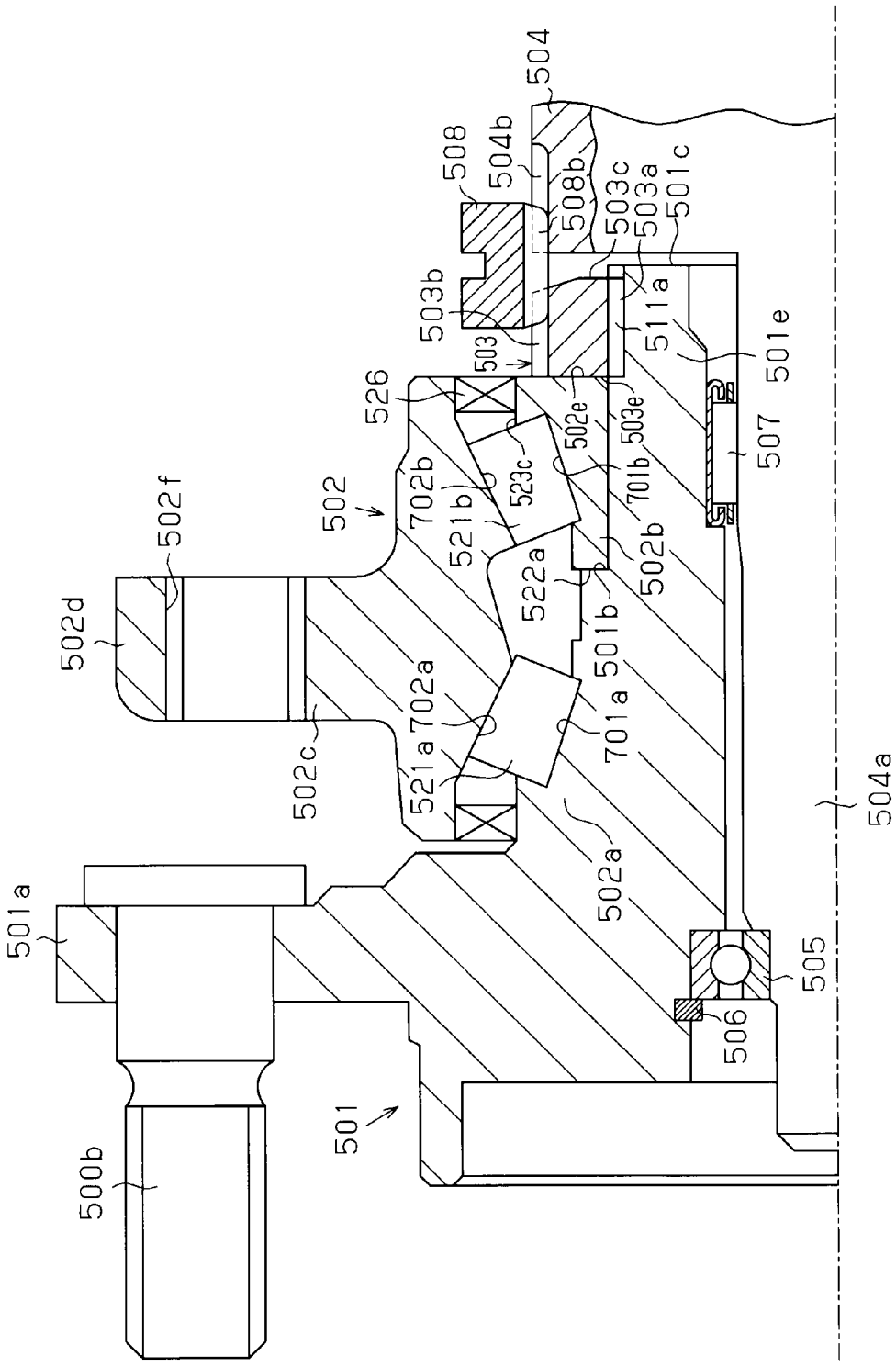
FIG. 11 is a cross-sectional view showing a structure of a double row tapered roller bearing apparatus in accordance with a modified embodiment of the present invention.

In the fifth embodiment, the bearing 502 is constituted by the double row tapered roller bearing provided with the first inner ring member 502a in the vehicle outer side and the second inner ring member 502b in the vehicle inner side, however, the first inner ring member 502a in the vehicle outer side may be integrated with the hub shaft 501 as shown in FIG. 11. As mentioned above, since the thickness of the hub shaft 501 can be sufficiently secured by integrating the first inner ring member 502a and the hub shaft 501 as mentioned above, a rigidity against torsion and bending of the hub shaft 501 is improved, and it is possible to more effectively improve the strength of the hub shaft 501. Further, since the inner ring member which is independent from the hub shaft 501 is constituted only by the second inner ring member 502b in the vehicle inner side, it is possible to more efficiently apply the pressing force to the second inner ring member 502b by the coupler ring 503. Accordingly, the bearing rigidity of the double row tapered roller bearing apparatus is more increased as a whole.

In the fifth embodiment, the roller bearing 502 is constituted by the double row tapered roller bearing using the tapered rollers 521a and 521b as the rolling elements. However, the structure is not limited to this, but may be constituted, for example, by a double row outside angular ball bearing using balls as rolling elements. In this case, since the rolling elements come into roller contact with the track surface, the friction torque becomes small and it is possible to achieve a lower torque and a higher speed of the wheel roller bearing apparatus.

In the fifth embodiment, nothing is interposed between the coupler ring 503 and the second inner ring member 502b. However, for example, a plain washer may be arranged between the coupler ring 503 and the second inner ring member 502b. In this case, on the basis of a great friction coefficient in the contact surface with the washer, it is possible to apply a suitable torque at a time of fastening the coupler ring 503. Further, in this case, even in the case that the outer diameter of the coupler ring 503 is small, and it is hard to apply a sufficient pressing force to the double row tapered roller bearing 502 by fastening the coupler ring 503, it is possible to apply a sufficient pressing force to the bearing 502 by using a plain washer having a large outer diameter.

In order to avoid the interference of the coupler ring 503 with the seal member 526 of the double row tapered roller bearing 502, the outer diameter of the coupler ring 503 may be set smaller than the diameter of the shoulder portion 523c of the second inner ring member 502b.

In order to avoid the interference of the coupler ring 503 with the seal member 526, the protruding portion may be provided in any one of the opposing end surfaces of the coupler ring 503 and the second inner ring member 502b, thereby arranging the coupler ring 503 away from the seal member 526.

The invention claimed is:

1. A wheel bearing apparatus comprising:
    a roller bearing;
    an inner shaft including a center hole allowing insertion of a drive shaft, the inner shaft including an outer circumferential surface to which the roller bearing is installed;
    a coupler ring fixed to the inner shaft by caulking an inner side end portion of the inner shaft, the coupler ring receiving a transmission of a rotation from the drive shaft via a clutch member; and
    a cylindrical bearing member comprising a plurality of rollers, the cylindrical bearing member being arranged entirely within the center hole and rotatably supporting the drive shaft,
    wherein the cylindrical bearing member has an outer side portion located away from a vehicle inner side of the wheel bearing apparatus and an inner side portion located at a vehicle inner side of the wheel bearing apparatus, and
    wherein an inner wall of the center hole is configured to be spaced from a cylindrical outer circumference of the inner side portion of the cylindrical bearing member and to first engage the cylindrical outer circumference of the cylindrical bearing member at an intermediate position along the length of the plurality of rollers such that the cylindrical outer circumference of the outer side portion of the cylindrical bearing member is in engagement with the inner wall of the center hole,
    wherein a portion of the inner wall of the center hole opposing the inner side portion of the cylindrical bearing member is a conical surface expanding toward a vehicle inner side.

2. The wheel bearing apparatus according to claim 1, wherein each of the rollers is a needle bearing.

3. The wheel bearing apparatus according to claim 1, wherein the conical surface has an angle between 20 and 60 minutes with respect to a center axis of the center hole.

4. The wheel bearing apparatus according to claim 3, wherein the each of the rollers is a needle bearing.

* * * * *